Patented Jan. 12, 1954

2,666,062

UNITED STATES PATENT OFFICE 2,666,062

OPTICAL BLEACHING AGENTS CONTAINING TWO 1:2:3-TRIAZOLE RINGS

Ernst Brunner, Wilmslow, and Frederic William Hindes, Upper Mill, England, assignors to The Clayton Aniline Company Ltd.

No Drawing. Application January 11, 1952, Serial No. 266,113

Claims priority, application Switzerland January 22, 1951

12 Claims. (Cl. 260—308)

According to this invention new compounds containing two 1:2:3-triazole rings and having the general formula

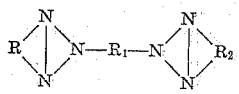

in which R and $R_2$ represent the same or different aromatic radicals in which two vicinal carbon atoms of a six-membered aromatic ring form part of the 1:2:3-triazole rings, and which radicals may contain substituents, and $R_1$ represents an aromatic radical of the benzene or naphthalene series which may contain substituents, are made by coupling a primary aromatic amine of the formula R—$NH_2$ (in which R represents an aromatic radical which may contain substituents) capable of coupling in ortho-position with respect to the amino group with a diazonium salt of an aromatic amine of the formula $H_2N$—$R_1$—X (in which $R_1$ has the meaning given above and X represents an atomic grouping convertible into a diazotizable amino group), oxidizing the resulting azo-compound to form the corresponding triazole of the formula

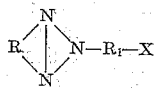

converting the atomic grouping X into a diazotizable amino group, diazotizing the latter group, coupling the resulting compound with a further aromatic amine of the formula $R_2$—$NH_2$ (in which $R_2$ represents an aromatic radical which may contain substituents) capable of coupling in ortho-position relatively to the amino group, and oxidizing the resulting azo-compound to form the di-triazole derivative.

The products of the invention can also be made by converting into a diazotizable amino group the atomic grouping X in the monoazo-compound of the formula

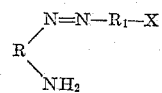

obtained by the first coupling operation, then diazotizing the latter compound, coupling the resulting product with an amine of the formula $R_2$—$NH_2$ defined above, and oxidizing the disazo-compound of the formula

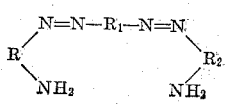

to form the di-triazole. However, this method can only be carried out when the amino grouping in ortho-position to the azo-bridge is substantially less reactive than the amino group formed from the atomic grouping X.

In a further method for making the compounds of the invention, when the atomic grouping X in the amine of the formula $H_2N$—$R_1$—X represents a diazotizable amino group, such amine, which corresponds to the formula $H_2N$—$R_1$—$NH_2$, is tetrazotized, coupled with two molecular proportions of an amine of the formula R—$NH_2$ or $R_2$—$NH_2$ or with one molecular proportion each of amines of the formulae R—$NH_2$ and $R_2$—$NH_2$, and the resulting disazo-compound is oxidized to the di-triazole.

The amines of the above formulae R—$NH_2$ and $R_2$—$NH_2$ used as starting materials are in general aryl amines, in which the aryl radical has one or more nuclei, which may or may not be fused or may be bound together, for example, by a carbon or oxygen bridge and may be substituted or unsubstituted. These aryl amines may be derived, for example, from benzene, naphthalene, diphenyl, diphenyl ether or substitution products thereof. As substituents in the aryl nuclei there come into consideration, for example, halogen atoms, alkyl, alkoxy, keto, cyano, tertiary amino or acylated amino groups, and also radicals which favor solubility in water, such as poly-alkylene glycol ether, carboxylic acid and especially sulfonic acid groups. There are advantageously used derivatives of naphthalene, and such compounds containing sulfonic acid groups are of special importance. Especially suitable are aminonaphthalene-sulfonic acids which are free from hydroxyl groups bound to the nucleus. For the purposes of the present invention there come into consideration, for example, the following compounds: 2-aminonaphthalene-3:6-disulfonic acid, 1-aminonaphthalene-3:8-disulfonic acid, 2-aminonaphthalene-6-sulfonic acid and 2-aminonaphthalene-5:8-disulfonic acid.

By using, for example, 2-aminonaphthalene-3:6-disulfonic acid as an amine of the above formulae R—$NH_2$ and $R_2$—$NH_2$ there are obtained compounds of the general formula

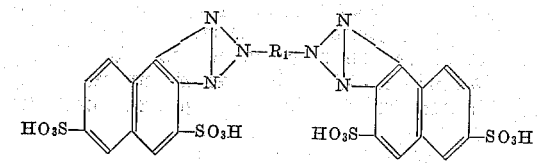

in which $R_1$ has the meaning given above. If different compounds are chosen as the amines of the formulae R—NH₂ and R₂—NH₂, for example, 2-aminonaphthalene-3:6-disulfonic acid as the amine of the formula R—NH₂ and 2-aminonaphthalene-6-sulfonic acid as the amine of the formula R₂—NH₂, there are obtained compounds of the general formula

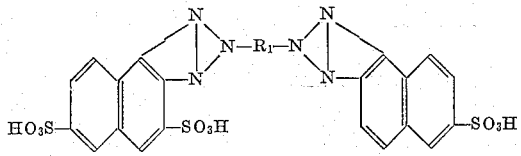

in which R₁ has the meaning given above.

The aromatic amines of the general formula H₂N—R₁—X used in the process of the invention may belong to various classes of compounds depending on the nature of X.

As atomic groupings represented by the symbol X and which are convertible into a diazotizable aromatic amino group, there may be mentioned above all nitro groups and acylamino groups. When X represents a nitro group the compounds correspond to the general formula H₂N—R₁—NO₂. These nitro-arylamines are derived, for example, from benzene or naphthalene or substitution products thereof, only such substituents coming into consideration as do not consist of or contain aromatic nuclei. As substituents there come into consideration, among others, halogen atoms, alkyl, alkoxy, keto or cyano groups, and also radicals which favor solubility in water, such as polyalkylene glycol ether, carboxylic acid and especially sulfonic acid groups. Among the nitro-arylamines to be used there may be mentioned: 1 - amino - 5 - nitro - naphthalene and nitranilines such as 4-nitro-2-chloraniline, 4-nitro - 2 - methyl - aniline, 4 - nitro-2-methoxy-aniline, and especially 4-nitraniline or 4-nitraniline-2-sulfonic acid.

When the symbol X in the formula H₂N—R₁—X represents an acylamino group, the compounds of this formula correspond to the general formula

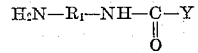

in which

represents the radical of an acid, advantageously an acetyl radical. These monoacylated diamines may be derived from the same parent compounds as the abovementioned nitro-amines, and they may also contain the same further substituents. In this case also there are especially suitable derivatives of benzene, for example, derivatives of para-phenylene diamine, such as monoacetylated para-phenylene diamine or 1-amino-4-acetyl-amino-benzene-2-sulfonic acid.

As stated above, the symbol X of the formula H₂N—R₁—X may also represent a diazotizable aromatic amino group. Such compounds, which correspond to the formula H₂N—R₁—NH₂ may be derived from the same parent compounds as those of the above-mentioned nitro-amines. Compounds which are suitable as starting materials are, for example, para-phenylene diamine and para-phenylene diamine sulfonic acid.

When there are used as compounds of the formula H₂N—R₁—X derivatives of benzene there are obtained compounds of the general formula

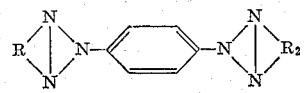

in which R and R₂ have the meanings given above.

The manufacture of the compounds of the invention is carried out in stages, the individual reactions being conducted by methods in themselves known.

The choice of the conditions for coupling depends to a great extent on the constitution of the components used and advantageously the reaction is conducted in a weakly acid medium.

The oxidation of the ortho-amino-azo-intermediate products to the corresponding triazoles may be carried out with chromic acid. However, there are advantageously used hypochlorites or cupric salts, such as an ammoniacal solution of copper sulfate.

When nitro-amines are used for the reaction, the reduction of the nitro group is carried out by known methods, for example, with metals and acids, such as iron and acetic acid or with sulfides such as sodium sulfide or with catalytically activated hydrogen.

When monoacylated diamines are used for the reaction, the acylamino group may be split off by known methods, for example, by hydrolysis with a solution of an alkali hydroxide. When the formation of the first triazole ring is brought about by oxidation with an ammoniacal solution of a copper salt, the splitting off of the acyl group may be carried out before or after the oxidation.

Among the compounds of the invention having the formula first mentioned above those which contain groups imparting solubility such as carboxylic acid or sulfonic acid groups, are preferred. Advantageously their water-soluble salts are prepared. Among these salts there may be mentioned: ammonium salts, alkali salts such as potassium and sodium salts, salts with primary, secondary or tertiary amines such as methylamine, diethylamine or triethanolamine.

The following are examples of the compounds of the invention corresponding to the general formula first mentioned above:

1 - [3':6' - disulfonaphtho - 1':2';4:5 - triazolyl - (2)] - 4 - [6' - sulfonaphtho - 1':2';-4:5 - triazolyl - (2)] - benzene, 1:4 - bis-[3':6' - disulfonaphtho - 1':2';4:5 - triazolyl - (2)] - benzene, 1:4 - bis - [5':7' - disulfonaphtho - 1':2';4:5 - triazolyl - (2)] - benzene, 1-[5':7' - disulfonaphtho - 1':2';4:5 - triazolyl-(2)] - 4 - [6' - sulfonaphtho - 1':2';4:5 - triazolyl - (2)] - benzene and 1 - [5':7' - disulfonaphtho - 1':2';4:5 - triazolyl - (2)] - 4 - [3':6'-disulfonaphtho - 1':2';4:5 - triazolyl - (2)]-benzene.

The new compounds and their salts are not dyestuffs but, depending on their constitution, possess a more or less pronounced affinity for a very wide variety of substrata such as vegetable or animal fibers. On these substrata they exhibit in ultra-violet light a blue to violet fluorescence. By virtue of this property the compounds of the invention are capable of improving the white content of undyed materials and the purity of color of dyed materials.

The compounds of the invention can be used by immersing the material to be treated with solutions, especially aqueous solutions, of the compounds, and drying the material after centrifuging or squeezing it. For example, white goods, especially after being washed in the ordinary manner, may be after-treated with compounds of the invention. The new compounds can also be used for after-treating printed cellulose materials.

The compounds of the invention may also be applied to the materials in the course of their manufacture, for example, by adding the compound to a paper pulp.

In general small quantities of the compounds of the invention suffice to produce an improvement.

The compounds of the invention may also be used in admixture with assistants such as are used for improving fibrous materials, for example, washing agents (for example soaps, salts of sulfonated washing agents such, for example, as sulfonated benzimidazoles containing a higher alkyl radical as a substituent at the 2-carbon atom, and also mono-carboxylic acid esters of 4-sulfophthalic acid with higher fatty alcohols or fatty alcohol sulfates or condensation products of higher fatty acids with aliphatic hydroxy- or amino-sulfonic acids). In this manner, the material to be improved can be simultaneously washed and optically bleached. An especially pronounced brightening effect is obtained by treating undyed vegetable or animal fibers, especially cotton or wool with such mixtures containing washing agents.

As materials which can be improved in accordance with the invention, there may be mentioned for example: natural or artificial nitrogenous materials such as wool, silk or synthetic polyamide fibers, cellulose materials such as cellulose, paper, and textile materials of cotton, linen, artificial silk or staple fibers of regenerated cellulose and synthetic materials, for example, those produced by polymerization. The best effects are obtained on vegetable and animal fibers. The materials to be improved may be in any desired form, for example, in the form of fibers or films. The materials may be undyed, or dyed or printed.

The following examples illustrate the invention the parts being by weight unless otherwise stated, and the relationship of parts by weight to parts by volume being the same as that of the kilogram to the liter.

*Example 1*

15 parts of monoacetylated para-phenylene diamine are diazotized in the usual manner and then coupled in the presence of sodium acetate with 30.4 parts of 2-aminonaphthalene-3:6-disulfonic acid at 5-10° C. When the coupling is finished, the reaction mixture is rendered alkaline to litmus with sodium carbonate at 50° C., and the dyestuff is salted out by the addition of sodium chloride at 70-80° C. The acetyl group is hydrolytically split up by heating the dyestuff for 3 hours at 90-95° C. in a sodium hydroxide solution of 4 per cent. strength. The excess of sodium hydroxide solution is neutralized by the addition of hydrochloric acid and the reaction product is salted out and separated by filtration. The product is again dissolved in water. To the solution is added the quantity of sodium nitrite calculated for the diazotization of an amino group. The solution is slowly run, while stirring, into a mixture of ice and water containing sufficient hydrochloric acid to maintain the reaction mixture acid to Congo. In this manner the amino group in para-position to the azo-bridge is diazotized. The resulting suspension of the diazonium salt is coupled in the presence of sodium acetate with 23 parts of 2-aminonaphthalene-6-sulfonic acid. When the coupling is finished the reaction mixture is rendered alkaline with sodium carbonate at 50° C., and the diazo-dyestuff is cautiously salted out at 80-90° C. The dyestuff is then dissolved in 2000 parts of water, and oxidized by the addition of 168 parts of ammonia solution of 30 per cent. strength and a solution of 100 parts of copper sulfate in 300 parts of water and stirring the mixture for 4 hours at 75-80° C. The solution is then rendered acid to Congo by the addition of 80 parts of sulfuric acid of 50 per cent. strength, the di-triazole is salted out, separated by filtration and washed with sodium chloride solution. For further purification the product may be again dissolved in water at 70-80° C., a small amount of sodium hydrosulfite added, and the product salted out, separated by filtration and dried.

In this manner there is obtained the sodium salt of 1 - [3':6'-disulfonaphtho-1':2';4:5-triazolyl - (2)]-4 - sulfonaphtho - 1':2';4:5-triazolyl-(2)]-benzene of the formula

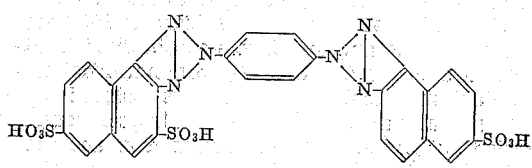

in the form of a pale yellow-brown to brown powder.

*Example 2*

13.8 parts of para-phenylene diamine are diazotized in the usual manner and coupled in the presence of sodium acetate with 30.4 parts of 2 - aminonaphthalene-3:6 - disulfonic acid. When the coupling is finished the reaction mixture is rendered alkaline to litmus by the addition of sodium carbonate at 40° C., and then the monoazo-dyestuff is salted out with sodium chloride at 70° C. and separated by filtration. The dyestuff is then dissolved in water and oxidized by adding 84 parts of ammonia solution of 30 per cent. strength and a solution of 50 parts of copper sulfate in 150 parts of water and then heating the mixture at 75-80° C. When the solution has lost its color the triazole derivative is isolated by acidifying the solution with sulfuric acid of 50 per cent. strength, salting out and filtering. The nitro group in the triazole derivative is then reduced to an amino group. For this purpose the nitro-compound is introduced, while stirring, into an aqueous suspension of 50 parts of iron shavings etched in the usual manner with acetic acid at 90° C. When the reduction is finished the mixture is rendered alkaline with sodium carbonate, the iron sludge is separated by filtration, the filtrate is rendered acid to Congo with hydrochloric acid and the reduction product is salted out. 42 parts of the resulting amino-triazole derivative are diazotized in the usual manner and coupled in the presence of sodium acetate with 30.4 parts of 2-aminonaphthalene-3:6-disulfonic acid. After the coupling, the mixture is rendered alkaline, and the product is salted out at 60° C. and separated by filtration. The coupling product is again dissolved in water and oxidized by adding 84 parts of ammonia solution of 30 per cent. strength and a solution of 50 parts of copper sulfate in 150 parts of water, and heating the mixture at 70-80° C. The resulting di-triazole is isolated and purified in the manner described in Example 1. There is obtained the sodium salt of 1:4-bis-

[3':6'-disulfonaphtho-1':2';4:5 - triazolyl - (2)]-benzene of the formula

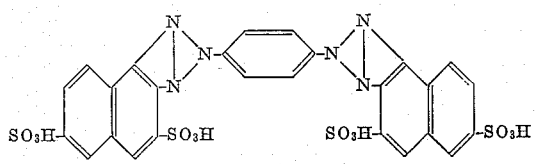

in the form of a yellow-brown powder.

Example 3

15 parts of monoacetylated para-phenylene diamine are diazotized and coupled in the presence of sodium acetate with 30.4 parts of 2-aminonaphthalene-5:7-disulfonic acid. The dyestuff is isolated, and the acetyl group is split off in the manner described in Example 1. The aminoazo-compound is dissolved in water and oxidized at 75–80° C. by the addition of 84 parts of ammonia solution of 30 per cent. strength and a solution of 50 parts of copper sulfate in 150 parts of water. The amino-triazole so obtained is diazotized and coupled with 2-aminonaphthalene-5:7-disulfonic acid, the dyestuff is isolated and the ring closure to form the second triazole ring is carried out in the manner described in the case of the first ring.

There is obtained the sodium salt of 1:4-bis-[5':7'-disulfonaphtho - 1':2';4:5-triazolyl - (2)]-benzene of the formula

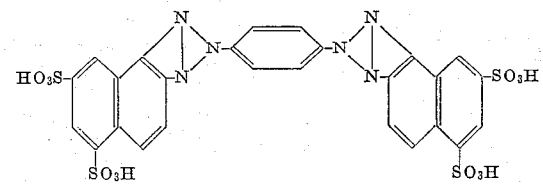

in the form of a white or pale yellow powder.

Example 4

13.8 parts of para-nitraniline are diazotized and coupled in the presence of sodium acetate with 30.4 parts of 2-aminonaphthalene-5:7-disulfonic acid. The mixture is then rendered alkaline and, without isolating the dyestuff, oxidized at 80–90° C. by adding 150 parts of hypochlorite solution containing 14% of active chlorine. The resulting triazole is salted out, separated by filtration and reduced with iron, as described in Example 2. 42 parts of the reduction product are diazotized, and coupled in the presence of sodium acetate with 23 parts of 2-aminonaphthalene-6-sulfonic acid. Oxidation of the coupling product, and the isolation and purification of the di-triazole are carried out in the manner described in the preceding examples.

There is obtained the sodium salt of 1-[5':7'-disulfonaphtho-1':2';4:5-triazolyl-(2)] - 4 - [6' - sulfonaphtho-1':2';4:5-triazolyl-(2)]-benzene of the formula

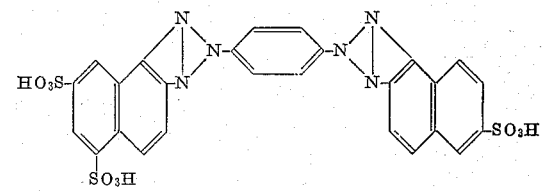

in the form of a pale yellow or yellow powder.

Example 5

42 parts of 1-[5':7'-disulfonaphtho-1':2';4:5-triazolyl-(2)]-4-aminobenzene, obtainable as described in Example 3 or 4, are coupled in the presence of sodium acetate with 30.4 parts of 2-aminonaphthalene - 3:6 - disulfonic acid. The dyestuff isolated under alkaline conditions is oxidized with an ammoniacal solution of copper sulfate in the manner described in the preceding examples, and the di-triazole is isolated and purified.

There is obtained the sodium salt of 1-[5':7'-disulfonaphtho - 1':2';4:5 - triazolyl - (2)]-4-[3':6' - disulfonaphtho - 1':2';4:5 - triazolyl-(2)]-benzene of the formula

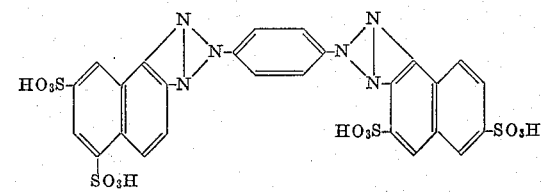

in the form of a greyish-yellow powder.

Example 6

A cotton fabric is treated at 50–55° C. for 30 minutes in a bath containing, per liter, 5 grams of soap and 0.015 gram of the product obtainable as described in Example 1. After being rinsed and dried the cotton has a much whiter appearance than cotton treated in a bath containing only soap.

Example 7

Soap is mixed with the product obtainable as described in Example 1 in the ratio of 5000:1. Textile goods of cotton, when washed with this mixture by an ordinary domestic washing method, has a whiter appearance than cotton washed with soap alone.

What is claimed is:

1. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings and corresponding to the general formula

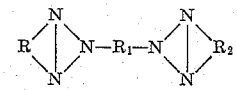

in which R and R₂ each represent an aromatic carbocyclic radical which contains at most two carbocyclic rings and in which two vicinal carbon atoms of a six-membered aromatic ring form part of the 1:2:3-triazole rings and which radical is free from groups imparting dyestuff characteristics, and R₁ represents an aromatic radical selected from the group consisting of phenyl and naphthyl radicals free from groups imparting dyestuff characteristics.

2. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings and corresponding to the general formula

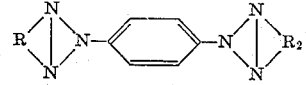

wherein R and R₂ each represent the radical of a naphthalene-sulfonic acid free from nuclear hydroxyl groups and from groups imparting dyestuff characteristics.

3. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings and corresponding to the general formula

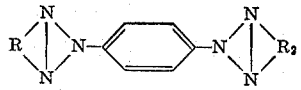

wherein R and R₂ each represent the radical of the same naphthalene sulfonic acid free from nuclear hydroxyl groups and from groups imparting dyestuff characteristics.

4. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings corresponding to the general formula

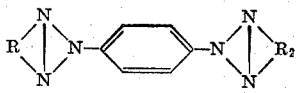

wherein R and R₂ represent the radical of a naphthalene disulfonic acid free from nuclear hydroxyl groups and from groups imparting dyestuff characteristics.

5. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings and corresponding to the general formula

wherein R and R₂ each represent the radicals of different naphthalene sulfonic acids free from nuclear hydroxyl groups and from groups imparting dyestuff characteristics.

6. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings and corresponding to the general formula

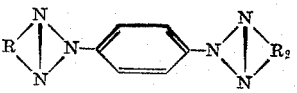

wherein R represents the radical of a naphthalene disulfonic acid free from nuclear hydroxyl groups and R₂ represents a naphthalene monosulfonic acid free from nuclear hydroxyl groups and from groups imparting dyestuff characteristics.

7. As an optical bleaching agent a compound which exhibits a blue to violet fluorescence in ultra-violet light and which, when applied thereto, improves the white content of undyed materials and the purity of color of dyed materials, said compound containing two 1:2:3-triazole rings corresponding to the general formula

wherein R and R₂ each represent the radicals of different naphthalene disulfonic acids free from nuclear hydroxyl groups and from groups imparting dyestuff characteristics.

8. As an optical bleaching agent a water soluble salt of 1-[3':6'-disulfonaphtho-1':2';4:5-triazolyl - (2) ] - 4 - [6' - sulfonaphtho - 1':2'; 4:5-triazolyl-(2) ]-benzene of the formula

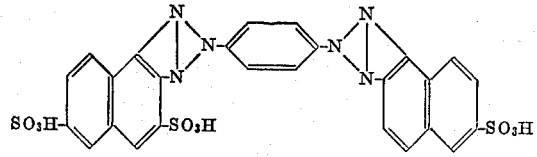

9. As an optical bleaching agent a water soluble salt of 1:4-bis-[3':6'-disulfonaphtho-1':2'; 4:5-triazolyl-(2)]-benzene of the formula

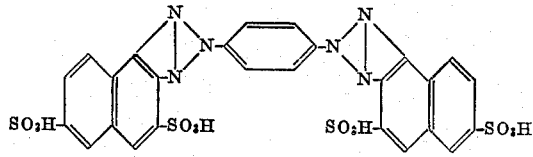

10. As an optical bleaching agent a water soluble salt of 1:4-bis-[5':7'-disulfonaphtho-1':2'; 4:5-triazolyl-(2)]-benzene of the formula

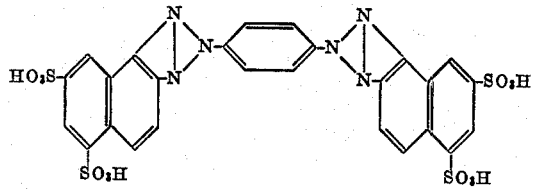

11. As an optical bleaching agent a water soluble salt of 1-[5':7'-disulfonaphtho-1':2';4:5-triazolyl - (2) ] - 4 - [6' - sulfonaphtho-1':2';4:5-triazolyl-(2) ]-benzene of the formula

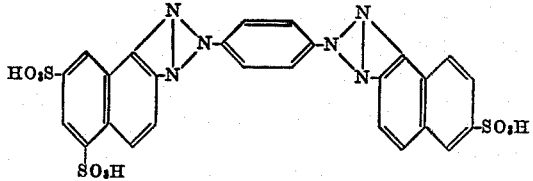

12. As an optical bleaching agent a water soluble salt of 1-[5':7'-disulfonaphtho-1':2';4:5-triazolyl -(2) ]- 4 -[3':6'- disulfonaphtho - 1':2'; 4:5-triazolyl-(2) ]-benzene of the formula

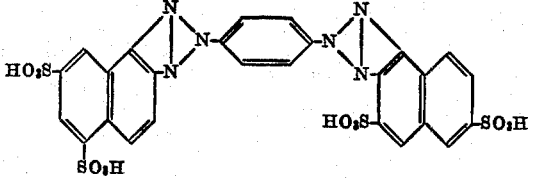

ERNST BRUNNER.
FREDERIC WILLIAM HINDES.

References Cited in the file of this patent
UNITED STATES PATENTS

| Number | Name | Date |
|---|---|---|
| 2,141,707 | Ebel | Dec. 27, 1938 |

FOREIGN PATENTS

| Number | Country | Date |
|---|---|---|
| 468,686 | Great Britain | July 6, 1937 |